(12) United States Patent
Wang

(10) Patent No.: US 11,823,513 B2
(45) Date of Patent: Nov. 21, 2023

(54) ELECTRONIC LOCK AND METHOD OF OPERATION

(71) Applicant: Focus Universal Inc., Ontario, CA (US)

(72) Inventor: Desheng Wang, Diamond Bar, CA (US)

(73) Assignee: Focus Universal Inc., Ontario (CA)

( * ) Notice: Subject to any disclaimer, the term of this patent is extended or adjusted under 35 U.S.C. 154(b) by 33 days.

(21) Appl. No.: 17/748,908

(22) Filed: May 19, 2022

(65) Prior Publication Data

US 2022/0375290 A1 Nov. 24, 2022

Related U.S. Application Data

(60) Provisional application No. 63/190,593, filed on May 19, 2021.

(51) Int. Cl.
*G07C 9/22* (2020.01)
*G07C 9/00* (2020.01)
*H04W 4/80* (2018.01)
*G06N 20/00* (2019.01)

(52) U.S. Cl.
CPC ............. *G07C 9/22* (2020.01); *G06N 20/00* (2019.01); *G07C 9/00309* (2013.01); *H04W 4/80* (2018.02); *G07C 2009/005* (2013.01); *G07C 2009/00769* (2013.01); *G07C 2209/08* (2013.01)

(58) Field of Classification Search
None
See application file for complete search history.

(56) References Cited

U.S. PATENT DOCUMENTS

| | | | |
|---|---|---|---|
| 8,935,691 B2 * | 1/2015 | Ben Ayed | H04L 67/306 717/169 |
| 2003/0154187 A1 * | 8/2003 | Hayakawa | G06F 16/273 |
| 2005/0206499 A1 * | 9/2005 | Fisher | E05B 19/0005 713/185 |
| 2022/0375290 A1 * | 11/2022 | Wang | H04W 4/80 |

* cited by examiner

*Primary Examiner* — Carlos Garcia
(74) *Attorney, Agent, or Firm* — Knobbe, Martens, Olson & Bear LLP

(57) ABSTRACT

Disclosed is a system and method for more secure card transactions. The security is generated by the use of a dynamic transaction number which is valid for only a single predetermined time interval. The transaction number is generated through a two step process. In a first step, time is used as an input to a transaction number function. The transaction number function outputs more than 16 digits. The second step uses the more than 16 digits for input and uses a ruleset to strip at least one digit to determine the transaction number valid for the predetermined time interval.

20 Claims, 4 Drawing Sheets

ELECTRONIC LOCK AND METHOD OF OPERATION

CROSS-REFERENCE TO RELATED APPLICATIONS

The present application claims the benefit of priority to U.S. Provisional Patent Application No. 63/190,593, filed May 19, 2021, the disclosure of which is hereby incorporated by reference in its entirety. Any and all applications for which a foreign or domestic priority claim is identified in the Application Data Sheet as filed with the present application are hereby incorporated by reference under 37 CFR 1.57.

FIELD

The present invention relates to a smart door lock which may be operated at least wirelessly.

BACKGROUND

Smart devices are spreading to many areas of homes and businesses. There have been many smart lock systems for doors. However, many must be operated through a local network, and some have to be operated through remote servers. While this may offer advantages such as being able to unlock a door from a distance, such technology is inherently less secure because the data travels at least through a local network, and, in some cases, through a wide area network. The data may be encrypted when exchanged, and it may be stored securely, but such security can be broken by either decryption, or by attacking the storage location.

Moreover, the coding required is more extensive to protect the information. Inevitably, the more extensive code requirements increase the cost of each lock. If the lock has to operate with encryption on multiple protocols, the lock must have code specific to each of those protocols. The coding time in development is extensive and drives the cost. While each of the protocols used may be well known, the precise code to get the device to operate, and the logic used to pass commands through any particular protocol is not. Development of such logic increases cost beyond the cost of providing the lock the ability to communicate over various protocols.

Even with encryption, state-of-the-art locks still use static codes or passwords and suboptimal connection schemes. Such static codes or passwords are more easily broken. Moreover, such codes may not work when there is lack of connectivity. For example, if the lock uses a wireless fidelity or WIFI® protocol, either the lock or the mobile device used to communicate with the lock may not be able to connect with the network. If even one of the devices is not connected to the network, the devices cannot communicate, and the mobile device will not be able to send messages to operate the lock. If there is another connection protocol available, for example, near field connectivity, the code being passed may not be encrypted and subject to sniffing. The static code or password, once intercepted, means that security of the lock will be compromised.

For the foregoing reasons, there is a need for a smart lock system where codes or passwords may be passed in the clear, and communication is limited to between the lock and a mobile device for unlocking the lock.

SUMMARY

Disclosed herein is a system for securely operating a lock. The system may include an application stored on a memory of a mobile device. The application may be configured to run on a processor of the mobile device. The processor may be electrically connected to the memory. The application may include a lock code algorithm. The lock code algorithm may include a lock code function which may use time as a variable to generate a first lock code function output, and a ruleset which may use the first lock code function output as an input and strips at least one predetermined digit from the first lock code function output to determine a first lock code. The system may further include a lock which may be electronically connected to the mobile device. The lock may receive the first lock code from the mobile device. The lock may include a second processor which may be electrically connected to a second memory. The second memory may include a copy of the lock code algorithm. The copy of the lock code algorithm may include a copy of the lock code function. The copy of the lock code function may also use time as an input and may output a second lock code function output. The copy of the lock code function may also include a copy of the ruleset which inputs the second lock code function output and strips predetermined digits from the second lock code function output to determine a second lock code to check against the first lock code from the mobile device.

Further disclosed herein is a method for creating a lock code for use in operating a lock. The method may include determining a current time. The method may further include inputting the current time to a lock code function. The method may also output more than 4 digits from the lock code function. The method may input the more than 4 digits to a ruleset. The ruleset may strip at least one digit from the more than 4 digits and may generate a lock code. The method may further output the lock code to at least one output component for use in a lock operation request.

Further disclosed is a system for greater security of a smart lock. The system may include an application which may run on a mobile device. The application may include a lock code function which uses time as a variable and may generate a first lock code number function output. The system may further include a set of control surfaces displayed on a touch display of the mobile device. The set of control surfaces may be configured to send commands to a first processor on the mobile device. The control surfaces may allow a user to edit the first lock code function output to generate a first lock code. The system may further include a lock which may be wirelessly connected to the mobile device. The lock may receive the first lock code from the mobile device. The lock may include a second processor electrically connected to a memory. The memory may include a lock code algorithm. The lock code algorithm may include a copy of the lock code function, which may use time as an input and may output a second lock code function output. The lock code algorithm may further include a ruleset which may input the second lock code function output and may strip predetermined digits from the second lock code function output to determine a second lock code, and may check the second lock code against the first lock code from the mobile device.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
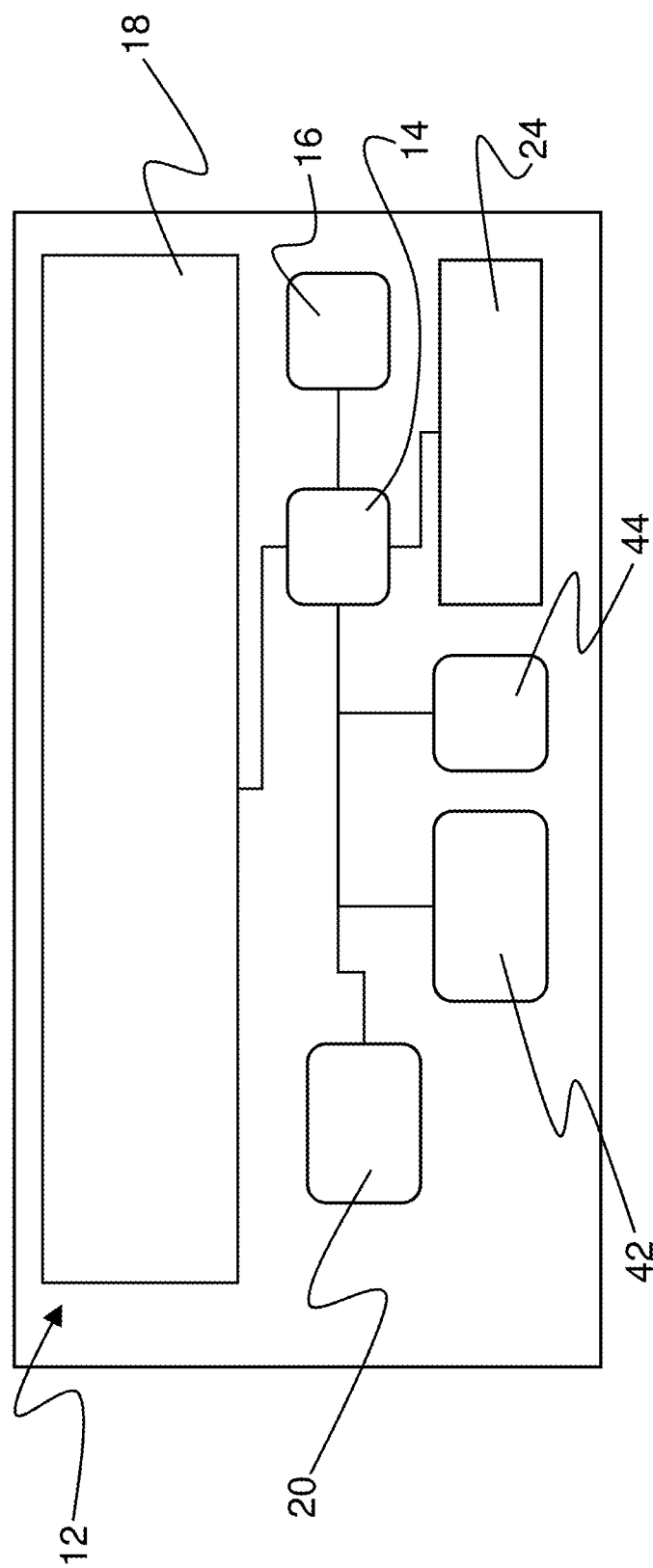
FIG. 1 shows a schematic view of a mobile device on which the application operates.

The detailed description set forth below in connection with the appended drawings is intended as a description of the presently preferred embodiment of an electronic lock and method to securely operate the lock, and is not intended to represent the only form in which it can be developed or utilized. The description sets forth the functions for developing and operating the system in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

The state of the art in smart lock security is based on encryption protocols and static codes or passwords. Disclosed herein is a method for operating a smart lock in which codes and passwords are dynamic and may be sent without any encryption required, because the security of the code or password lies in its dynamic nature. Such codes and passwords vary with time, and are only valid for use during a limited period. The algorithm that causes them to vary is not passed between devices, thus making secure.

The heart of the security of the disclosed lock method for operating the lock consists of a lock code algorithm of two parts. Both the first and second parts are established during assembly and programming of the lock. During assembly and programming, a manufacturer encodes a lock code function rather than associating a static password or code with the lock. The lock code function has a single variable. That variable is time. Thus, the lock code generated by either a mobile device interacting with the lock or by the lock itself during validation is dynamic as a function of time. The function may be a linear formula, such as a(t)+b=x, with the variable "t" being time. Alternatively, it may be any function the manufacturer wishes to use, and the manufacturer may change the function from account to account, as is discussed in further detail below. The second part of the security of the disclosed lock operation method is that certain predetermined digits of the output from the function are stripped before the lock code is output. By way of example and not limitation, it may be the first three digits of the output result of the lock code function which are stripped from the output. Alternatively, it is contemplated that non-consecutive digits may be stripped from the output, and that more than three, or fewer than three, digits may be stripped from the output. Further, the number or pattern of digits being stripped may change from lock to lock, and correspondingly, from mobile device to mobile device, when each mobile device is interacting with a different lock. The number or pattern of digits being stripped may change each time the lock is operated for even the same lock and mobile device.

In one embodiment, to initiate an opening of the lock, a user may operate a control surface on the mobile device to provide the lock code to the lock. The lock code is determined at specified time intervals by the mobile device. For example, the mobile device may determine a new lock every minute. Alternatively, the lock code may be determined at intervals less than a minute or more than a minute. Still further alternatively, the lock code may only be determined once the mobile device is connected to the lock. The lock code is determined using time as an input to the function, and then the lock code algorithm continues, taking the output of the function and stripping certain digits of that output to determine the output lock code. This process is discussed in detail below.

The mobile device itself would still need to be safeguarded because, at least in some embodiments, if a criminal obtained control of the mobile device, the criminal would have access to both the function, and the means to determine which digits of the function output are to be stripped. In some embodiments, possession of the phone alone could allow for unlocking of the lock.

The lock code is sent from the mobile device to the lock. The lock then validates the transaction number presented by the processor. Thus, both the mobile device and the lock must have the same copy of the lock code algorithm. Both must also be keyed to the same time source to avoid the nearly inevitable drift of time keeping devices.

The manufacturer loads a copy of the entire lock code algorithm on the lock. That, is, the manufacturer loads a copy of both the transaction number function and the instructions as to which digits of the function output are to be stripped on a non-transient memory on the lock. Using the time as provided by radio wave as an input, the lock determines the output of the copy of the lock code function stored in the non-transient memory, and then uses the copy of the instructions on which digits to strip to determine the lock code. The lock checks the lock code determined on board against the lock code provided by the mobile device. If there is a match, the lock code is validated, and the lock opens.

The information stored in the non-transient memory of the lock would need to be carefully safeguarded, but there are limited ways to access this memory. The disclosed lock and method of operation protects the security of the door through the lock code algorithm, which replaces the state-of-the-art static code or password. The lock code algorithm provides a more secure lock code, at least in part because the lock code is changing with every time interval. Even if the lock code is intercepted, the lock code is not static, and therefore cannot be used outside of the time interval or again within the same time interval. Nor can the lock code be predicted, even if the function is discovered, because certain digits of the function output are stripped from it, and the lock code cannot be predicted without both pieces of information.

The digits which are to be stripped may be determined in one of several different ways. In a first embodiment, the digits to be stripped may be the same for all locks manufactured by an manufacturer. For example, the second step of the lock code algorithm may be instructions that the first, second, and fourth digits are always to be stripped. While this option provides additional security, it provides the least additional security of the different embodiments disclosed herein.

In a second embodiment, the manufacturer may set instructions as to which digits are to be stripped on a lock by lock basis. That is, the function output digits which are being stripped are different for each lock manufactured by the manufacturer, or, at least, which digits being stripped are rarely duplicated.

In a third embodiment, the digits to be stripped may change in either of the above circumstances. That is, the digits to be stripped may also be determined by a second function for which time is the variable. By way of example and not limitation, the first three digits of the result of the function may be used. If one of the digits is a repeat of a previous digit, that digit may be skipped, until all three are unique. Alternatively, if the digit is a one, the next digit may be combined to get a digit between 10 and 20.

Figure 2:
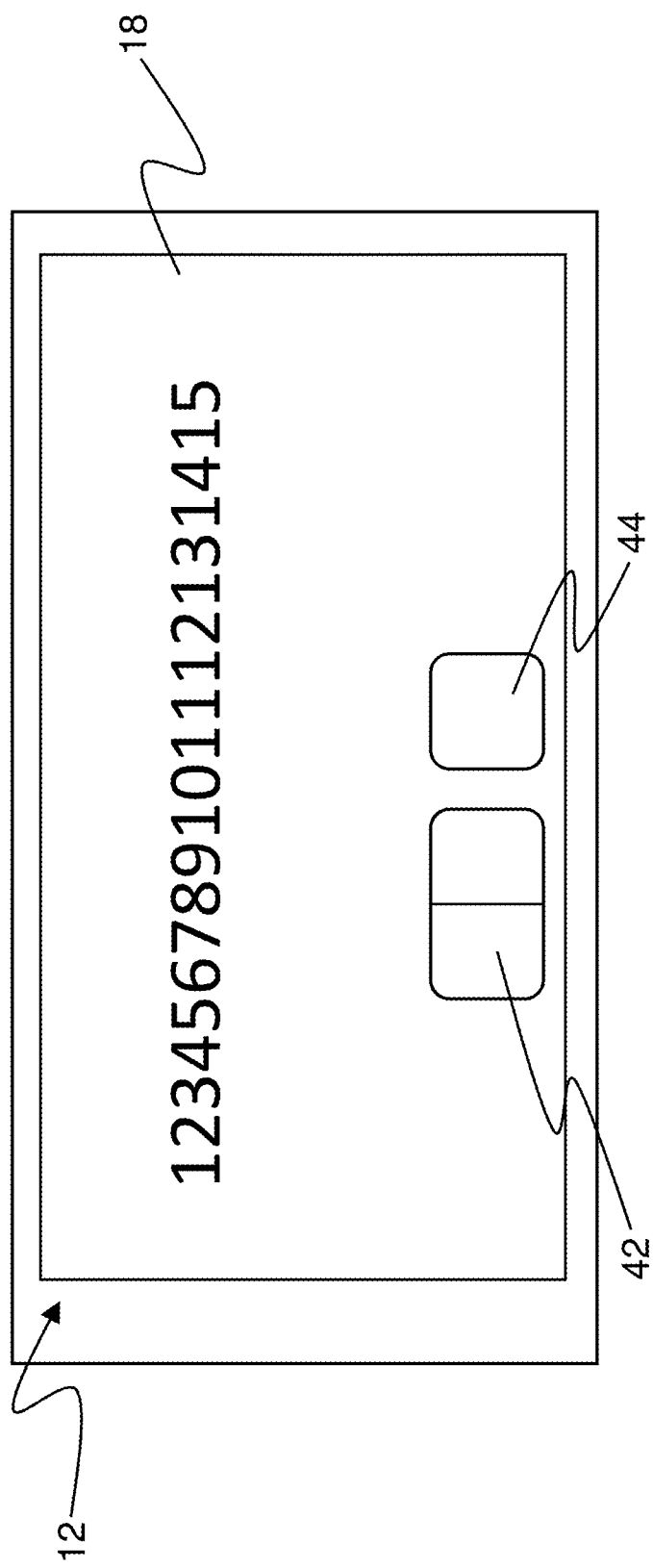
FIG. 2 shows a schematic view of a mobile device with control surfaces on the display.

As shown in FIGS. 1 and 2, a mobile device 12 includes software to generate a lock code and to transmit required information in a lock opening operation. The mobile device 12 includes a processor 14 and a memory 16, the memory 16 including the lock code algorithm used to create the lock code and instructions to output the lock code to one or more output components. The output components may include displays 18 and transmission components. The transmission components may include a transmitter 20 for wireless transmission, including Bluetooth®, or near field communication (NFC), or, WiFi®, or some combination or all of the above. The lock 26 itself may be ultimately an output component. The processor 14 and the memory 16 may be electrically connected by wiring, traces on a printed circuit board, or other means known in the art.

The mobile device 12 may further include a radio receiver 24 to receive a radio signal which carries information detailing the correct time. The radio receiver 24 may be electrically connected to the processor 14 by wiring, traces on a printed circuit board, or other means known in the art. The radio signal or signals received may be, for example in the United States, a broadcast signal originating from a station broadcasting near Fort Collins, CO. The Fort Collins station includes an antenna array which broadcasts at 60 kHz, 2.5 MHz, 5 MHz, 10 MHz, 15 MHz, 20 MHz, and 25 MHz, at powers varying from 1 kW to 70 kW. The radio receiver 24 may receive one or more of these signals, demodulate the signal to obtain the time data, and pass the time to the processor 14. The processor 14 may use the time as an input to the transaction number function as is described further below.

The mobile device 12 may also include a display 18 for displaying an output of the key code. The display 18 may use any of a number of display technologies, including e-Ink displays, liquid crystal displays (LCD), and other technologies known in the art. The display 18 may be electrically connected to the processor 14 by wiring, traces on a printed circuit board, or other means known in the art.

Figure 3:
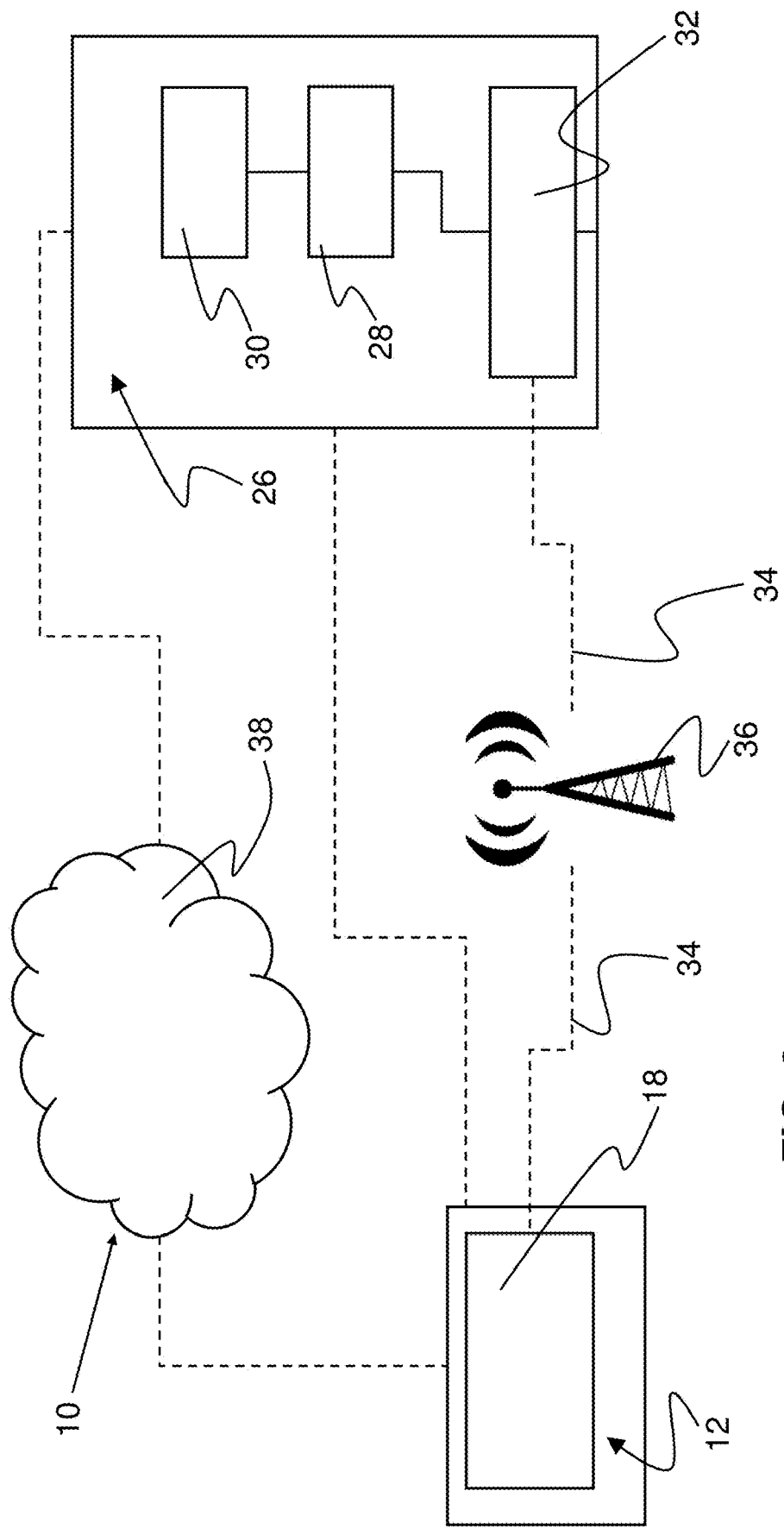
FIG. 3 shows a schematic diagram of a system including a lock and mobile device.
Figure 4:
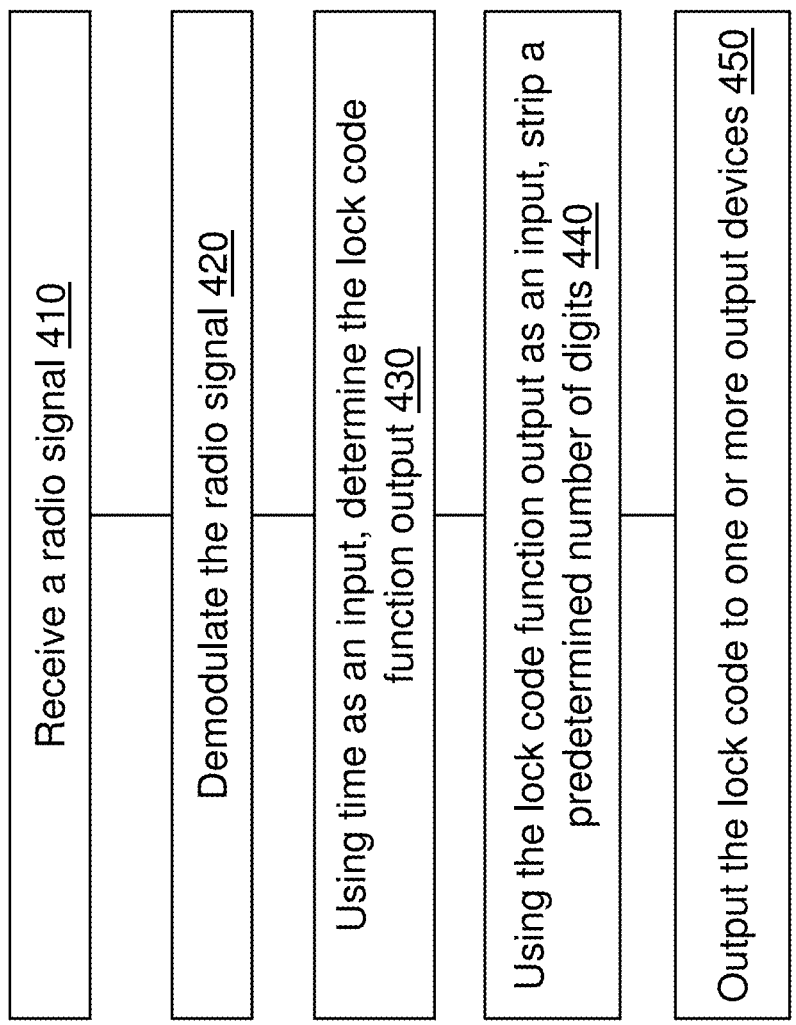
FIG. 4 shows a flowchart of a method of creating a lock code.

In reference to FIG. 3, the mobile device 12 forms part of a system 10. A operation processed on the system will involve at least a user, a lock, a door, and a door frame. The user is an individual, and physically holds the mobile device used to send the lock code to the lock. The lock is the device securing the door, which may be opened by sending the lock code from the mobile device. The door encloses to opening to the structure to which the user wishes to gain entry. The door frame is the structure to which the door is attached, and which receives a portion of the locking mechanism of the lock.

The lock system 10 may include a lock 26 on the door. The lock 26 may include at least one processor 28 and at least one memory 30. The memory 30 may have files stored thereon. The files may include the lock code algorithm, specifically, the lock code function used to generate an output, and the ruleset used to determine which digits are to be stripped from the output of the lock code function.

The memory 30 may further include instructions for communicating with other devices, for example, when validating lock codes. The operation of the instructions is described further below.

The lock 26 may be electrically connected to a radio receiver 32 through wiring, traces on printed circuit boards, or other means known in the art. The radio receiver 32 may receive longwave radio signals 34 which include information regarding the current time. One common style of radio receiver 32 uses time signals transmitted by dedicated terrestrial longwave radio transmitters, which emit a time code that can be demodulated and further processed by the radio receiver 32, including being displayed or sent as data to other components in a system. The radio receiver 32 may also contain an accurate time base oscillator to maintain timekeeping if the radio signal is momentarily unavailable.

The radio signals 34 may be sent from a central location and modulated to include information as to the current time. The radio signals may be referenced to a very accurate time keeping device, for example, an atomic clock. In the United States, the radio signal used may be that sent from a station 36 broadcasting near Fort Collins, CO for example. The Fort Collins station includes an antenna array which broadcasts at 60 kHz, 2.5 MHz, 5 MHz, 10 MHz, 15 MHz, 20 MHz, and 25 MHz, at powers varying from 1 kW to 70 kW. The radio receiver 32 may receive one or more of these signals to determine the time. The radio transmissions contain a time code that may be demodulated and then used as data in the transaction number algorithm. With the time data input, the processor may determine an output from the transaction number function. Time may also be used as an input to a second function which determines which digits are to be stripped from the output of the transaction number function, The lock 26 in the door may be wirelessly connected to a local area network 38. The electrical communication allows the server to send messages on the local area network 38 to other devices connected to the local area network 38. The local area network 38 may carry status messages and route the status messages to router connected to a wide area network, for example, the internet, for connectivity to the mobile device 12 when the mobile device is not in range for direct connectivity, for example, via Bluetooth® or NFC. The status messages may include status information regarding the lock, for example, the status message may inform the user that the lock is open or unlocked.

When connected directly via Bluetooth® or NFC, the lock 26 may validate a lock code. In order to validate the lock code, the lock 26 may use the processor 28 and instructions stored on the memory 30 to compare lock codes, as is discussed further below in connection to the operation of the system 10. The lock 26 may then use the local area network 38 to send messages to other devices stored in a list in the memory 30 on the lock 26 including status information for the lock 26. The lock 26 may use the direct connection to perform the validation operation.

With reference to FIGS. 1-4, in operation, a lock 26 may be installed on a door. The lock 26 may go through a registration process with a plurality of user devices. As part of the registration process, the mobile device may provide identification information to the lock. The identification information may be used to connect via a wireless protocol, and may be used in conjunction with one or more operation requests made in the future. The identification information, when used in conjunction with an operation request, may allow the lock to identify the mobile device as an authorized operation requestor for that lock.

Contemporaneously, the lock may have a code lock algorithm assigned, the code lock algorithm and at least some of the identification information may be saved on the memory 30 of the lock 26. An application may be installed on the mobile device, and the lock code algorithm saved on the memory 16 of the mobile device 12. The lock code algorithm may have two steps. The first step includes determining an output form the code lock function. The lock code function may be used in determining the lock code used in operating the lock, as well as generating a lock code used to validate the lock operation request. The lock code function may take any of several forms. The transaction number function may be a simple equation. By way of example, and not limitation, the transaction number function may be a linear equation of the form a(t)+b=output, where "t" is time, "a" is a predetermined coefficient, and "b" is a constant, typically a non-zero integer. In order to make the time function properly in the transaction number function, the time may be converted to a Julian-style expression. For example, the minute starting at midnight to 59 seconds after midnight is the first minute of the day, and thus may be expressed as minute one, and a "1" used as the time in the transaction number function. The following minute may be expressed as minute two, and a "2" used in the transaction number function, and so on until minute 1440. Alternatively, the first minute may be 1440, and the minutes would count down from 1440 to 1. As a third alternative, a random number generator may be used to determine a starting point between 1 and 1440. The time will then increment up to 1440 and then cycle to 1, and back up to one less than the starting point.

Alternatively, the lock code function may use a sine, cosine, or tangent function. The sine, cosine, or tangent function may take the place of the "a" in the line function. Thus, the complete transaction number function may be, for example, sin(t)+b=output. Again, "t" is the time, which may be determined in any of the ways discussed above. The letter "b" represents a constant, typically a non-zero integer.

The lock code function may be any function the manufacturer wishes to use, and is not limited to these examples. Some functions may return more randomized results than others, and may be more desirable for that reason. The manufacturer may vary the form of the lock code function from lock to lock. This provides improved security in that if one lock is compromised, the form of the lock code function cannot be determined for the other locks.

Regardless of the chosen form of the lock code function, the lock code always uses time as a variable, and the lock code is set to change at a predetermined time interval. For example, the time interval may be one minute. This disclosure also contemplates time intervals of more than one minute and time intervals of less than one minute. The technology of the system is able to provide very accurate time intervals due to the precise nature of the radio broadcast pegged to an atomic clock, but any time interval chosen must take in to account the time required for an operation request to be sent over to the lock 26, and for the validation to the performed on the lock 26. This process, is, of course, not instantaneous, but in most circumstances will take less than a minute. Thus, the time interval must at least be long enough for the operation request to pass to the lock 26 and then to be validated with the entire lock code algorithm on the lock 26 producing the same lock code as that sent by the mobile device 12. The need for this will become more obvious with further discussion of the process below, but alternative embodiments may account for a work around as well.

Next, the lock code algorithm moves to the second step. Using the entirety of the output from the lock code function, the output is reviewed against a ruleset, which may also be termed a set of instructions. The ruleset requires that certain digits within the output from the lock code function be stripped. In one embodiment, this rule may take a form consistent across all locks. That is, the ruleset may require that all locks must strip a set of predetermined digits of the output from the lock code function, and use the resulting first 20 digits of the remaining digits as the lock code. By way of example and not limitation, the ruleset may require that the first three digits must be stripped. After stripping the first three digits, the remaining first 20 digits form the lock code. This disclosure also contemplates stripping fewer than three digits, and more than three digits. Moreover, there is no requirement that the digits to be stripped be consecutive. It may also be that the ruleset first truncates the output to provide only as much of the output of the lock code function as needed to determine the lock code. That is, if the resulting lock code is to be 20 digits, and four digits are to be stripped, then 24 digits are provided. This ruleset is encoded with the data on both the lock 26 and on the mobile device 12 as part of the instructions to determine a lock code.

In another embodiment, the lock code function outputs a result, which may have the number of digits truncated, and each lock 26 includes a ruleset which strips different digits from the output, or, at least, rarely duplicates which digits are stripped. In this embodiment, when the manufacturer builds a lock, a method may be used to determine which digits will be stripped from the output of the lock code function for that specific lock. For example, a random number generator may be used to determine which digits will be stripped. If the random number generator returns any duplicate digits within the result from the random number generator, then the generator may be instructed to run again, until a result with no duplicate digits is returned. For example, if four digits are being stripped, then the random number generator might return a four-digit number, for example, 3273. Because the number three appears twice, such a result instructs the processor 28 to run the random number generator again. The second time, the random number generator returns the number 8235. Because none of the digits repeat, an instruction to strip the second digit, the third digit, the fifth digit, and the eighth digit of the lock code function output is encoded with the lock 26 on the memory 30, and placing the instruction along with the lock code function on the mobile device 12, and encoding the lock code algorithm. The ruleset is applied to the output of the lock code function in the second step of the lock code algorithm to determine the lock code.

In a third embodiment, the user may actively strip the digits from the lock code function output in the second step of the lock code algorithm. Further to this, rather than encoding this as instructions on the memory 16 for the processor 14 on the mobile device 12 to execute, a set of control surfaces on a touch screen of the mobile device 12 are provided for the user to edit the lock code function output. The set of control surface may include a two-part button 42 which allows the user to move through the digits of the lock code function output in either direction, and a delete button 44, which strips a digit from the output of the lock code function, deleting it. The digits which are to be edited by the user are static through a plurality of time periods. By way of example, and not limitation, a user may choose 61173 as a digit editing code. In this case, the digit editing code is not a traditional code that is entered when the user is prompted, such as a PIN or locked code would be, but is representative of the digits to be stripped from the output of the lock code function. The mobile device 12 has instructions which cause a 24-digit lock code to be presented. The user may use the controls to select the third, sixth, seventh, and eleventh digits, and delete them from the output, resulting in a 20-digit lock code that may be sent during an operation request.

This third embodiment has the advantage of additional security. Because the ruleset providing instructions as to which digits are to be stripped is not stored on the mobile device 12 but memorized by the user, a criminal obtaining the mobile device 12 would face an extremely difficult time trying to determine which digits should be stripped from the results of the lock code function output. In contrast, which digits are to be stripped would still be stored in the lock 26, as the verification is an automated process. However, information stored with the lock is more secure due to the amount of security employed by the manufacturer to protect such information. Thus, the overall level of security is increased in this third embodiment.

In a fourth embodiment, the digits to be stripped may change with each time interval. That is, the digits to be stripped may be determined by a second function for which time is the sole variable. If one of the digits is a repeat of a previous digit, that digit may be skipped, until all three are unique. For example, the second function may return a result where the first five digits are 43469. Thus, the result can accommodate stripping three, four, or five digits, depending on the chosen ruleset. The above result would mean that the third, fourth, and fourth digits are to be stripped if just three digits are being stripped, and the third, fourth, fourth, and sixth digits are to be stripped if four digits are being stripped, and third, fourth, fourth, sixth and ninth digits of the lock code function output are to be stripped if five digits are being stripped. Obviously, the fourth digit is repeated. In this case, the ruleset would deal with the case of three or four digits being stripped by moving from the repeated digit to the next digit and then onward. In the case of a five-digit strip, output would be increased to allow for possible repeat digits. Thus, if five digits are being stripped, at least six, and likely seven or more digits to ensure enough alternative digits are available in the circumstance that there are more than one repeat digits. Thus, if several digits in a row are the same, the ruleset requires that the processer keeps moving through the output until non-repeating digits are found. The ruleset, including the determined digits, is applied to the output from the lock code function, the application of the ruleset determining the lock code. Because the determination of the lock code is not instantaneous, the lock code algorithm may start before the previous time interval is over. In this way, a new lock code is immediately available at the start of a new time interval.

Alternatively, if the digit to be used as determined in the second or third embodiments is a one or two, for example, a special case occurs. As one possibility of the ruleset, the one may indicate that the first digit of the lock code function is to be stripped. However, the lock code may include 20 digits. The tenth through sixteenth digits would not be stripped no matter the output if this was on the only way the "1" was interpreted. Thus, this possibility somewhat limits the security which may be provided by stripping certain digits of the lock code function output.

However, this disclosure provides an alternate way for interpreting a "1" which occurs in the results of either the random number generator, or the result of a digit stripping function. The "1" digit may be combined with the next digit to get a number between 10 and 19. In the case of a two, the algorithm may interpret a first two as the second digit, and if a second two appears in the results of the random number generator, that second two may be interpreted as a 20, and the 20th digit stripped, accordingly. Alternatively, the first two appearing the results may be interpreted as the 20th digit, and the second two appearing in the results may be interpreted as the second digit to be stripped.

The entirety of the lock code algorithm, that is, both the lock code function and the rule regarding stripping predetermined digits may be placed on the mobile device 12, with the exception of the embodiment where the user performs the deletion of the digits, wherein only the lock code function is placed on the mobile device 12. At or before the predetermined time interval, the mobile device 12 uses the received time to run the lock code algorithm, determining an output from the lock code function, and then either uses that output, along with the rule requiring the stripping of certain digits of that output to determine the lock code for that time interval, or outputs the first 24 digits of that output for the user to further process using the control surfaces on the touch screen of the mobile device 12. If the lock code algorithm is set to run before the time interval begins, then an instruction is included to increment the time to the next time interval. If the lock code is not used during that time interval, it is discarded. If it is used, it may not be used again during the same time interval. Thus, no additional lock operations may be performed until the next time interval.

Further, the instructions may include a rule that requires a user to override an automated security protocol if operation requests occur in three consecutive predetermined time intervals. For example, if the predetermined time interval is one minute, and operations requests occur in a first minute, the minute following, and the minute following that one, the lock may freeze further validation of operation requests until a user either enters an override code on the mobile device 12, or logs in to a website provided by the lock manufacturer to remove the lockout. This lockout measure provides additional security, as a user is unlikely to have multiple operations requests within such a short time interval. Such use of a mobile device 12 is far more indicative of criminal use than typical user use. Thus, this measure strikes a balance between an allowance for some irregular user use in exchange for allowing some potential for criminal use.

In a typical lock operation, the user may initiate the process of unlocking by using the mobile device 12 to create an operation request. Alternatively, the process may be initiated as soon as the user brings the mobile device 12 within wireless range of the lock 26, and a wireless connection is established between the mobile device 12 and the lock 26. Upon establishing the wireless connection, an operations request may be processed automatically, with the lock code algorithm running on the mobile device 12, and the lock code being transmitted to the lock 26, and soon as the lock code algorithm determines a lock code.

In the one embodiment above where the user manually deletes the extra digits of the lock code function output, such action would have to be taken prior to the lock code being transmitted from the mobile device 12 to the lock 26. In any embodiment, prior to the initiation of an operation request, as seen in FIGS. 1-4, the mobile device 12 receives a radio signal in step 410. The mobile device 12 may demodulate that radio signal to obtain information regarding the current time in step 420. At the next time interval, the mobile device 12 executes the lock code algorithm by using time as an input to the lock code function, generating the lock code function output in step 430. Also prior to initiating an operation request, the mobile device 12, using the lock code function output as an input, applies the ruleset to strip a predetermined number of digits from the output to determine a lock code, as is shown in step 440. In step 450, the lock code is output to the lock 26.

Physically, the user may either carry the mobile device 12 to within wireless range of the lock 26 in order for the mobile device 12 and the lock to connect wirelessly and for the mobile device 12 to begin processing an operations request, or the user may initiate an operations request on the mobile device 12 by opening an application, connecting to the lock 26 using a wireless connection and taking the necessary steps, which may include actively digit stripping, to send a lock code to the lock 26. When the application on the mobile device 12 is opened, the mobile device may automatically connect to the lock 26 via wireless means. The application may output the lock code function output to the display of the mobile device 12, so the user may use the control surfaces to strip the digits, and send the lock code through the wireless connection to the lock 26.

The lock code is passed over the wireless connection directly to the lock 26 with the operation request, for example, to open the lock 26. Once communication is established between the mobile device 12 and the lock 26, the mobile device 12 either automatically provides the lock code, or provides it as soon as the digits are manually stripped by the user. The lock 26 uses the lock code to determine if the lock operation requested should be carried out.

As noted above, in the first step of the validation, the mobile device 12 provides the lock 26 with the lock code. Using the time received by the radio receiver 32 and sent in the radio signal, the lock 26 runs the lock code function to generate an output of the first step of the lock code algorithm. On the lock 26, the processor 28 outputs the result of the lock code function to the next step in the lock code algorithm, namely, digit stripping. The ruleset stored on the lock memory 30 is executed by the processor 28 on the lock 26, and the algorithm strips the digits from the output of the lock code function using whichever embodiment the manufacturer has placed on the lock. In the second step of the validation, the lock 26 checks the result of the lock code algorithm against the lock code provided by the mobile device 12. If there is a match, the lock validates the operation request. If there is not a match, the lock declines the operation request.

In performing the validation, the lock takes the received time information from the radio signal, and inputs that information in to the lock code function. Because there is a single source for the radio signal, for example the broadcast from Fort Collins, CO, the time used by the mobile device 12 and the time used by the lock 26 are the same. The predetermined time interval length is critical in facilitating the operation requests. If the predetermined time interval is too short, the time it takes to the operation request to be processed may cause the system to move beyond the time interval, yielding a declined operation request. Such a "false positive," that is, it is a legitimate operation request from the user, but the operation request is declined because the lock code determined by the mobile device 12 and the lock code determined by the lock 26 were determined in two different time intervals. In order to avoid this situation, in some embodiments the lock 26 may determine the lock code for the current time interval and for the previous time interval. If the lock code provided by the mobile device 12 matches either of the lock code for the current time interval or the lock of the previous time interval, the lock 26 may validate the operation request.

If the operation request is approved, the lock 26 performs the operation request. Operation requests may include opening the lock 26 or closing the lock 26.

After the operation is performed, for example, the lock is opened, the application may include computer code which automatically disconnects the mobile device 12 from the lock 26. The automatic disconnection of the mobile device 12 from the lock 26 allows for two things to occur. First, it allows another mobile device to connected to the lock 26 to perform an operation request. Second, it allows computer code placed on the lock 26 to perform a check of the lock status. If the lock 26 shows that it is in an open status, but the door to which the lock 26 is mounted is in a closed status, the lock 26 may include further computer code which automatically closes the lock after a predetermined period of time.

The lock 26 may further include computer code which uses a WiFi® protocol to send messages regarding status of the lock 26. For example, when the lock 26 performs an unlock operation, the lock 26 may send a message to any devices subscribed to a status message service of the lock 26. Fox example, a user outside of the direct connection range of the lock 26 may get a push notification that the lock 26 was opened. After a user closes the lock 26, or after the lock 26 closes automatically, another push notification may be sent with information that the lock's status has changed from open to locked. Alternatively, or in addition, status notifications may be sent for the door being open or closed. The lock 26 may determine the door status through the use of proximity sensors. These sensors are well known in the art and are regularly used in conjunction with home security systems. The sensor itself may be integrated with a home security system, and provide data to both the home security system and the lock simultaneously. The sensor may connect with the lock through a wired or wireless connection. For example, the sensor may connect to the lock through a WiFi® connection to a network 38.

Below are some nonlimiting example embodiments described above.

In a 1st Example, a system for securely operating a lock, comprising: an application stored on a memory of a mobile device and configured to run on a processor of the mobile device, the processor being electrically connected to the memory, the application including a lock code algorithm including: a lock code function which uses time as a variable to generate a first lock code function output; and a ruleset which uses the first lock code function output as an input and strips at least one predetermined digit from the first lock code function output to determine a first lock code; and a lock electronically connected to the mobile device and configured to receiving the first lock code from the mobile device, the lock including: a second processor electrically connected to a second memory, the second memory including a copy of the lock code algorithm, the copy of the lock code algorithm including: a copy of the lock code function using time as an input and outputting a second lock code function output; and a copy of the ruleset which inputs the second lock code function output and strips predetermined digits from the second lock code function output to determine a second lock code to check against the first lock code from the mobile device.

In a 2nd Example, the system of Example 1, wherein the first lock code is determined for each of a plurality of time intervals each day.

In a 3rd Example, the system of any of Examples 1-2, wherein the ruleset strips three digits.

In a 4th Example, the system of any of Examples 1-3, wherein the ruleset strips four digits.

In a 5th Example, the system of any of Examples 1-4, wherein the ruleset includes a randomly selected, but unchanging set of digits to be stripped.

In a 6th Example, the system of any of Examples 1-5, wherein the ruleset includes a dynamic randomly selected set of digits independently determined for each time interval is stripped.

In a 7th Example, the system of any of Examples 1-6, wherein the lock code function is a linear function.

In a 8th Example, a method for creating a lock code for use in operating a lock, comprising: determining a current time; inputting the current time to a lock code function; outputting more than 4 digits from the lock code function; inputting the more than 4 digits to a ruleset; stripping, using the ruleset, at least one digit from the more than 4 digits to generate a lock code; and outputting the lock code to at least one output component for use in a lock operation request.

In a 9th Example, the method of Example 8, wherein the current time is received in a radio signal.

In a 10th Example, the method of any of Examples 8-9, wherein the lock code function is a linear function.

In a 11th Example, the method of any of Examples 8-10, wherein the ruleset strips a static set of digits from the more than 4 digits.

In a 12th Example, the method of any of Examples 8-11, wherein the ruleset dynamically determines a set of digits to strip for each time interval.

In a 13th Example, a system for greater security of a smart lock, comprising: an application running on a mobile device, including: a lock code function which uses time as a variable to generate a first lock code number function output; a set of control surfaces displayed on a touch display of the mobile device, the set of control surfaces configured to send commands to a first processor on the mobile device, the control surfaces allowing a user to edit the first lock code function output to generate a first lock code; and a lock wirelessly connected to the mobile device, the lock receiving the first lock code from the mobile device, the lock including: a second processor electrically connected to a memory, the memory including a lock code algorithm, the lock code algorithm including: a copy of the lock code function using time as an input and outputting a second lock code function output; and a ruleset which inputs the second lock code function output and strips predetermined digits from the second lock code function output to determine a second lock code, and checks the second lock code against the first lock code from the mobile device.

In a 14th Example, the system of Example 13, further comprising a first radio receiver electrically connected to the first processor and a second radio receiver electrically connected to the second processor, the radio receiver receiving a radio signal including information providing the current time.

In a 15th Example, the system of Example 14, wherein the current time is continuously sent to the first processor for use in the lock code function and the second processor for use in the copy of the lock code function.

In a 16th Example, the system of any of Examples 13-15, wherein the ruleset strips a static set of digits in each time interval.

In a 17th Example, the system of any of Examples 13-16, the mobile device further comprising a radio receiver.

In a 18th Example, the system of Example 17, wherein the radio receiver demodulates a received signal to obtain data regarding the current time, and provides it to the first processor.

In a 19th Example, the system of any of Examples 13-18, wherein the application includes computer code to send the first lock code to the lock via a Bluetooth protocol.

In a 20th Example, the system of any of Examples 13-19, wherein the lock code function includes at least one of sine, cosine, or tangent.

The above description is given by way of example, and not limitation. Given the above disclosure, one skilled in the art could devise variations that are within the scope and spirit of the invention disclosed herein, including various ways of forming the transaction number function. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for securely operating a lock, comprising:
an application stored on a memory of a mobile device and configured to run on a processor of the mobile device, the processor being electrically connected to the memory, the application including a lock code algorithm including:
a lock code function which uses time as a variable to generate a first lock code function output; and
a ruleset which uses the first lock code function output as an input and strips at least one predetermined digit from the first lock code function output to determine a first lock code; and
a lock electronically connected to the mobile device and configured to receiving the first lock code from the mobile device, the lock including:
a second processor electrically connected to a second memory, the second memory including a copy of the lock code algorithm, the copy of the lock code algorithm including:
a copy of the lock code function using time as an input and outputting a second lock code function output; and
a copy of the ruleset which inputs the second lock code function output and strips predetermined digits from the second lock code function output to determine a second lock code to check against the first lock code from the mobile device.

2. The system of claim 1, wherein the first lock code is determined for each of a plurality of time intervals each day.

3. The system of claim 1, wherein the ruleset strips three digits.

4. The system of claim 1, wherein the ruleset strips four digits.

5. The system of claim 1, wherein the ruleset includes a randomly selected, but unchanging set of digits to be stripped.

6. The system of claim 1, wherein the ruleset includes a dynamic randomly selected set of digits independently determined for each time interval is stripped.

7. The system of claim 1, wherein the lock code function is a linear function.

8. A method for creating a lock code for use in operating a lock, comprising:
determining a current time;
inputting the current time to a lock code function;
outputting more than 4 digits from the lock code function;
inputting the more than 4 digits to a ruleset;
stripping, using the ruleset, at least one digit from the more than 4 digits to generate a lock code; and outputting the lock code to at least one output component for use in a lock operation request.

9. The method of claim 8, wherein the current time is received in a radio signal.

10. The method of claim 8, wherein the lock code function is a linear function.

11. The method of claim 8, wherein the ruleset strips a static set of digits from the more than 4 digits.

12. The method of claim 8, wherein the ruleset dynamically determines a set of digits to strip for each time interval.

13. A system for greater security of a smart lock, comprising:
 an application running on a mobile device, including:
  a lock code function which uses time as a variable to generate a first lock code number function output;
  a set of control surfaces displayed on a touch display of the mobile device, the set of control surfaces configured to send commands to a first processor on the mobile device, the control surfaces allowing a user to edit the first lock code function output to generate a first lock code; and
 a lock wirelessly connected to the mobile device, the lock receiving the first lock code from the mobile device, the lock including:
  a second processor electrically connected to a memory, the memory including a lock code algorithm, the lock code algorithm including:
   a copy of the lock code function using time as an input and outputting a second lock code function output; and
   a ruleset which inputs the second lock code function output and strips predetermined digits from the second lock code function output to determine a second lock code, and checks the second lock code against the first lock code from the mobile device.

14. The system of claim 13, further comprising a first radio receiver electrically connected to the first processor and a second radio receiver electrically connected to the second processor, the radio receiver receiving a radio signal including information providing the current time.

15. The system of claim 14, wherein the current time is continuously sent to the first processor for use in the lock code function and the second processor for use in the copy of the lock code function.

16. The system of claim 13, wherein the ruleset strips a static set of digits in each time interval.

17. The system of claim 13, the mobile device further comprising a radio receiver.

18. The system of claim 17, wherein the radio receiver demodulates a received signal to obtain data regarding the current time, and provides it to the first processor.

19. The system of claim 13, wherein the application includes computer code to send the first lock code to the lock via a Bluetooth protocol.

20. The system of claim 13, wherein the lock code function includes at least one of sine, cosine, or tangent.

\* \* \* \* \*